(12) United States Patent
Lee

(10) Patent No.: US 6,286,667 B1
(45) Date of Patent: Sep. 11, 2001

(54) PALM-TOP CALCULATOR AND NAME CARD CASE COMBINATION

(76) Inventor: Ming-Te Lee, 5F-23, 70, Fu-Shing Rd., Taoyuan (TW)

( * ) Notice: Subject to any disclaimer, the term of this patent is extended or adjusted under 35 U.S.C. 154(b) by 0 days.

(21) Appl. No.: 09/389,145

(22) Filed: Sep. 2, 1999

(51) Int. Cl.⁷ ................................................ A45C 11/00
(52) U.S. Cl. ............................ 206/38; 206/305; 206/320
(58) Field of Search .................................. 206/18, 37, 38, 206/305, 320, 766; 364/705.01, 708.1

(56) References Cited

U.S. PATENT DOCUMENTS

| | | | |
|---|---|---|---|
| 2,567,564 | * | 9/1951 | Ingraham ................................ 206/18 |
| 3,162,997 | * | 12/1964 | Schmidt ................................. 206/38 |
| 4,259,568 | * | 3/1981 | Dynesen ............................... 206/305 |
| 4,703,160 | * | 10/1987 | Narishima ........................... 206/305 |
| 4,768,648 | * | 9/1988 | Glass ..................................... 206/38 |
| 5,560,476 | * | 10/1996 | Lee ........................................ 206/38 |

* cited by examiner

*Primary Examiner*—David T. Fidei

(57) ABSTRACT

A palm-top calculator and name card combination, which includes a top cover shell and a bottom cover shell pivoted together, a partition board pivoted to the cover shells on the inside for closing on the inside of the top cover shell to hold storage name cards in the top cover shell, and a calculator pivotally mounted in a rectangular center opening at the bottom cover shell, wherein male and female positioning means are respectively provided at the bottom cover shell and the calculator for securing the calculation between two reversed positions in the center opening at the bottom cover shell.

2 Claims, 6 Drawing Sheets

PALM-TOP CALCULATOR AND NAME CARD CASE COMBINATION

BACKGROUND OF THE INVENTION

The present invention relates to a palm-top calculator and name card case combination.

FIG. 1 shows a conventional palm-top name card case, which comprises a top cover shell 1', a bottom cover shell 2', and a calculator 3'. The top cover shell 1', bottom cover shell 2' and calculator 3' are pivoted together by a pivot. The calculator 3' can be turned about the pivot, and received within the top cover shell 1'. The bottom cover shell 2' defines a storage space 21' for keeping name cards (business cards). This design of palm-top name card case is still not satisfactory in function. Because there is no means to secure the calculator 3' and the bottom cover shell 2' positively together, storage name cards may fall out of the name card case when opening the name card case.

SUMMARY OF THE INVENTION

The present invention provides a palm-top calculator and name card combination, which eliminates the aforesaid problem. According to one aspect of the present invention, the palm-top calculator and name card combination comprises a top cover shell, a bottom cover shell pivoted to the top cover shell, a partition board pivoted to the top and bottom cover shells, wherein male and female locking means are respectively provided at the top cover shell and the partition board for enabling the partition board to be locked in position to hold storage name cards inside the top cover shell. According to another aspect of the present invention, the bottom cover shell comprises a rectangular center opening and two upright lugs at two opposite sides of the center opening, and a calculator is pivotally connected between the upright lugs in the center opening at the bottom cover shell. According to another aspect of the present invention, means are provided to secure the calculator in the center opening at the bottom cover shell between two reversed positions.

DETAILED DESCRIPTION OF THE PREFERRED EMBODIMENT

Figure 1:
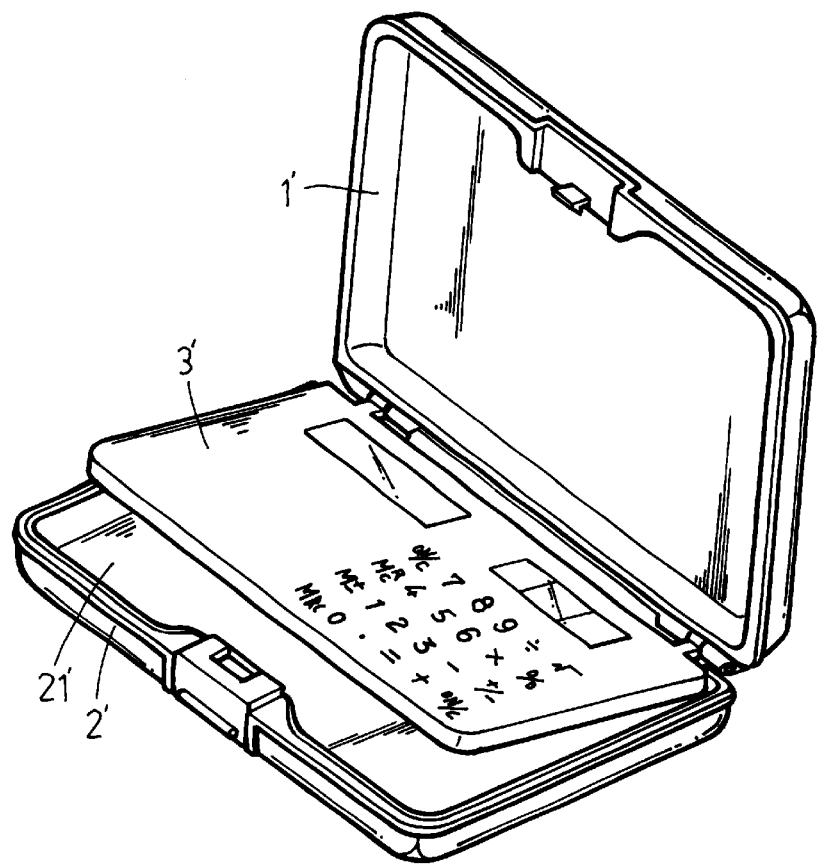
FIG. 1 illustrates the positioning of a calculator in a name card case according to the present invention.
Figure 2:
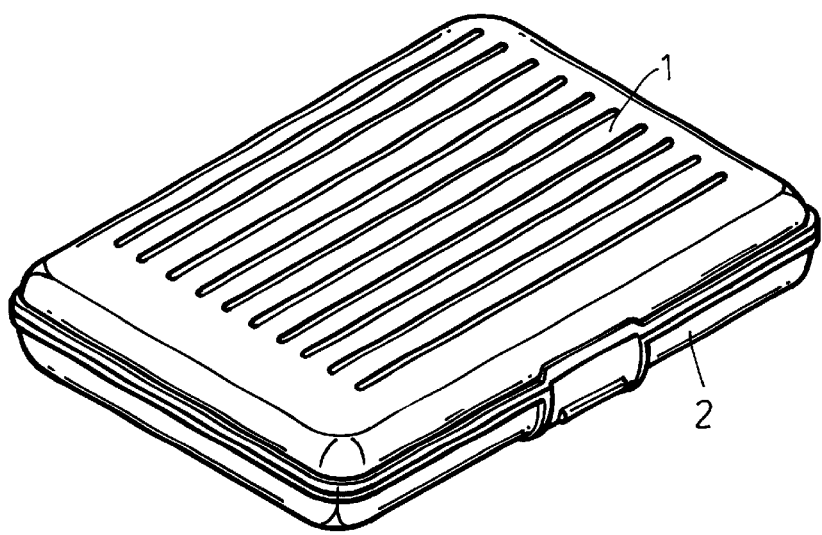
FIG. 2 is an oblique top view of the present invention showing the palm-top calculator and name card case combination closed.
Figure 3:
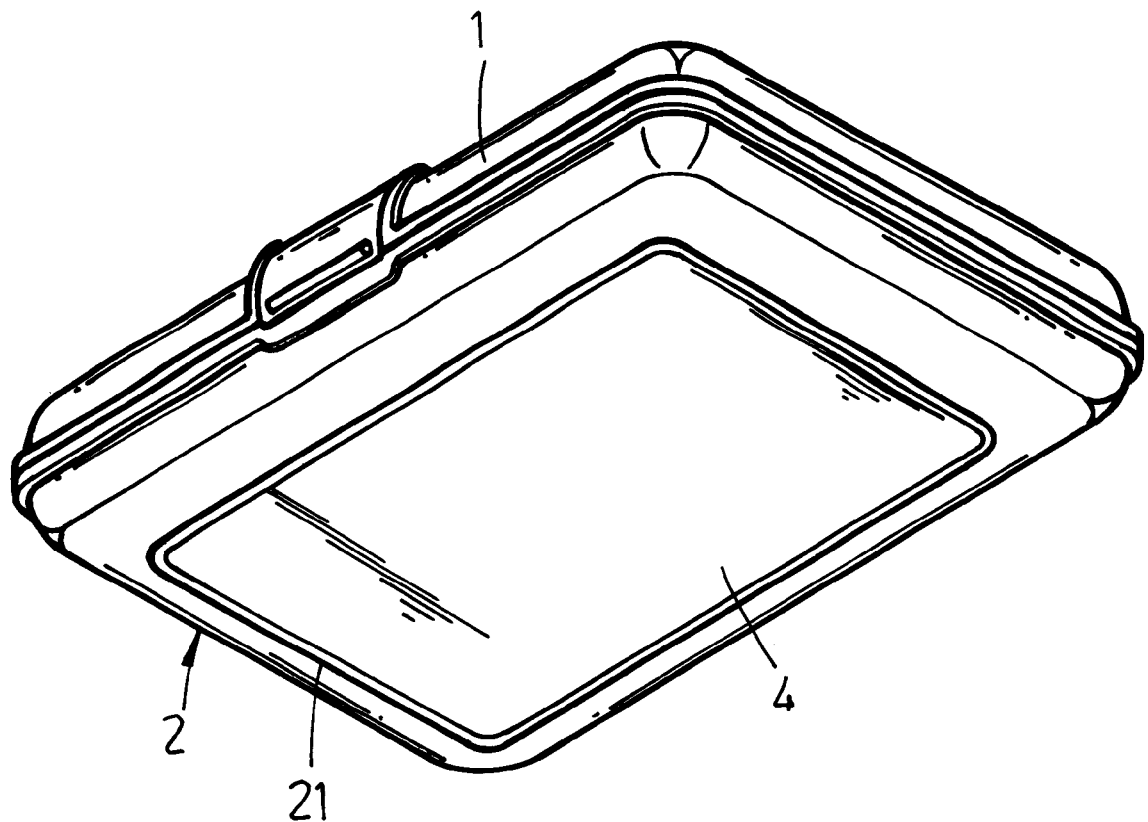
FIG. 3 is an oblique bottom view of the present invention, showing the palm-top calculator and name card case combination closed.
Figure 4:
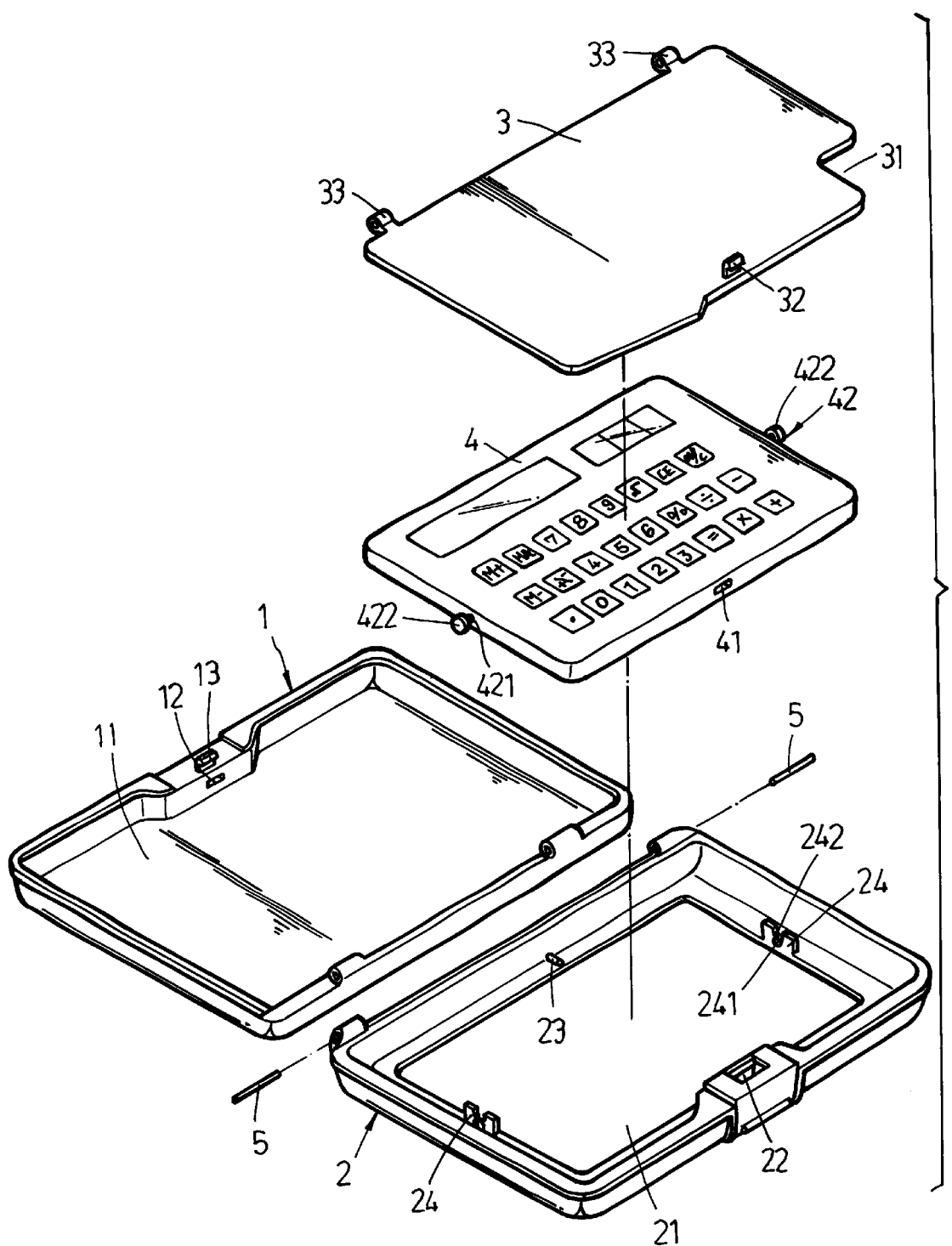
FIG. 4 is an exploded view of the present invention.

Referring to FIGS. from 2 through 5, a palm-top calculator and name card combination in accordance with the present invention is shown comprised of a top cover shell 1, a bottom cover shell 2, a partition board 3, and a calculator 4. The top cover shell 1 and the bottom cover shell 2 are pivotally connected together by pivot pins 5. When the top cover shell 1 and the bottom cover shell 2 are closed, the male locking means (hook) 13 at the top cover shell 1 is fastened up with the female locking means (hook hole) 22 at the bottom cover shell 2, keeping the cover shells 1 and 2 retained in the closed condition. The top cover shell 1 defines a recessed receiving space 11 for keeping name cards. The partition board 3 is pivotally coupled to the pivots 5, for covering the recessed receiving space 11, comprising two barrels 33 bilaterally disposed at one side edge thereof and respectively coupled to the pivots 5, a springy hook 32 raised from a bottom side wall thereof on the middle near one side edge thereof remote from the barrel 33 for engaging into a retaining hole 12 at the top cover shell 1 to secure the partition board 3 in the closed position, and a finger notch 31 in one corner thereof adjacent to the springy hook 32 through which the partition board 3 can be conveniently opened from the recessed receiving space 11 with one finger. When a number of name cards are received in the recessed receiving space 11, the partition board 3 is closed to hold storage name cards in the recessed receiving space 11.

Figure 5:
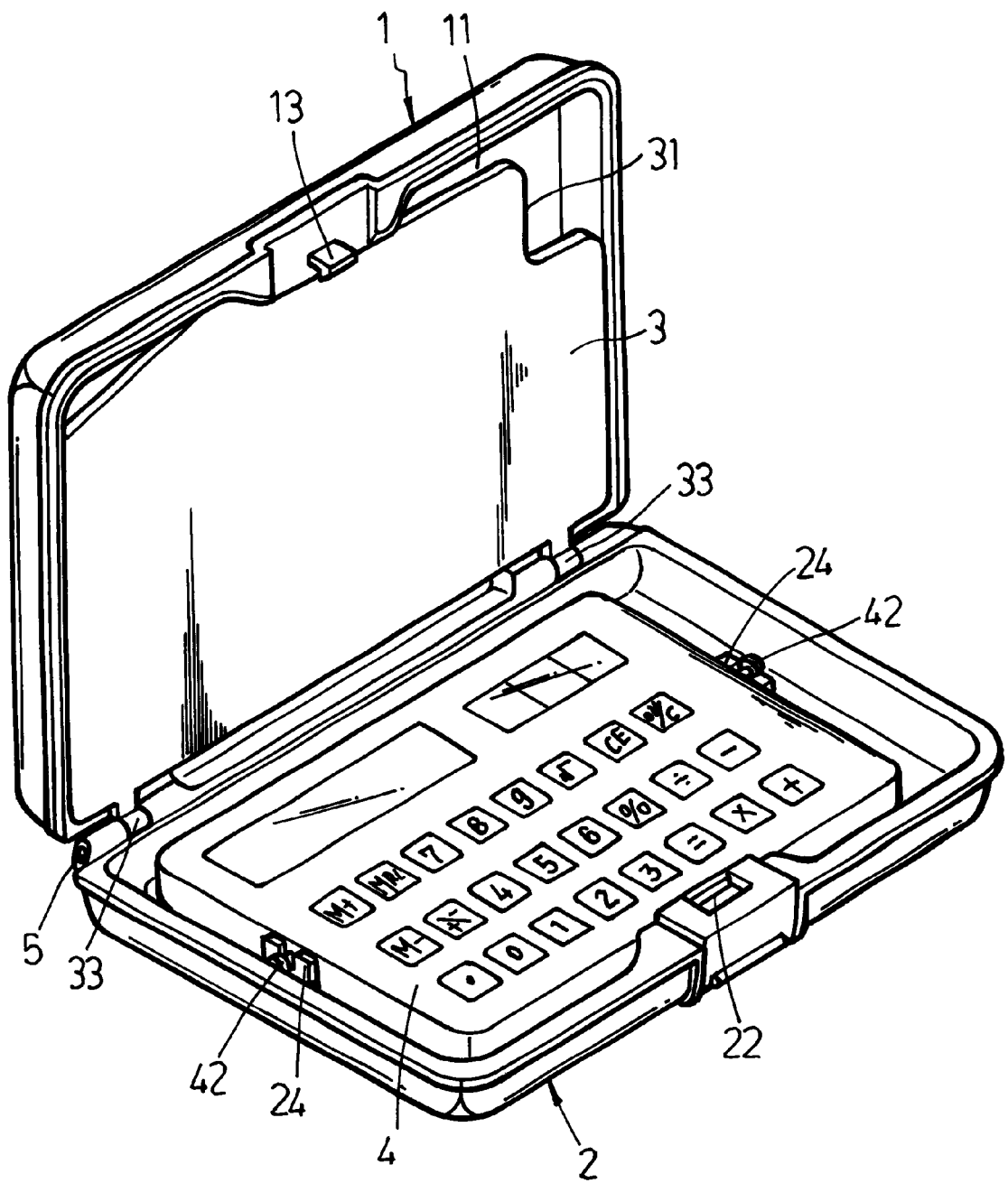
FIG. 5 is a perspective view of the present invention showing the top cover shell opened, the calculator maintained in the first position.
Figure 6:
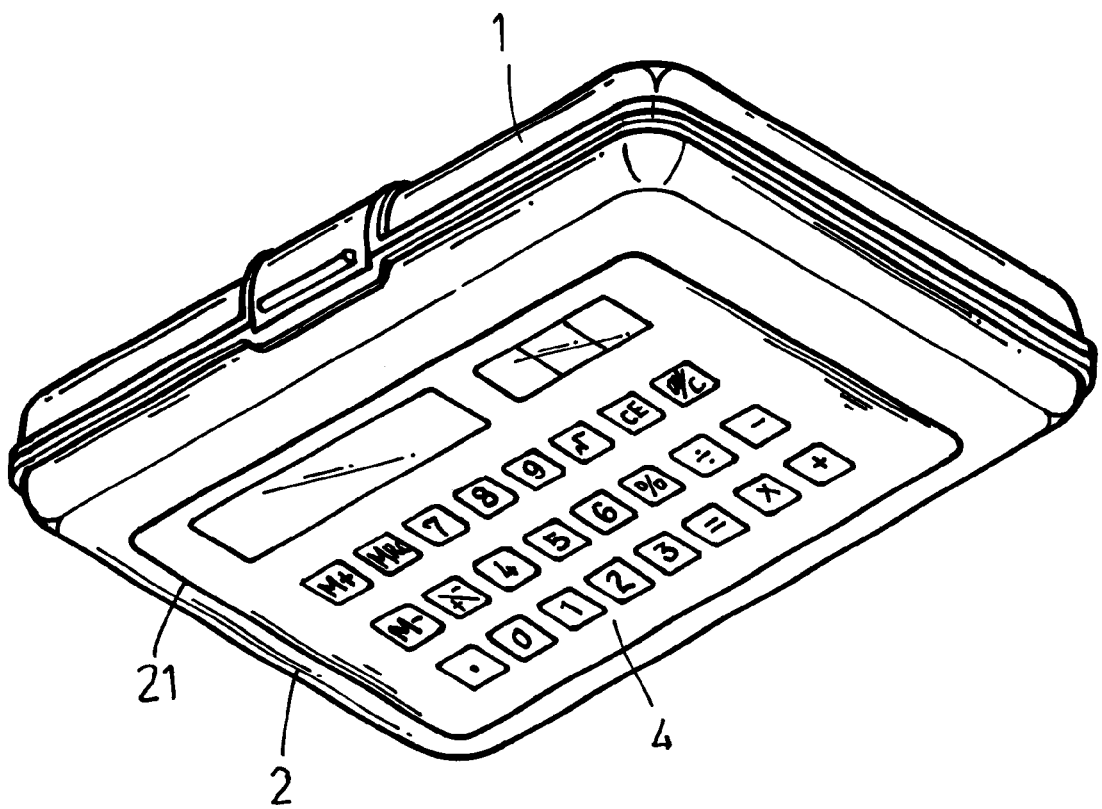
FIG. 6 is illustrates the top cover shell and the bottom cover shell closed, the calculator set in the second position.
Figure 7:
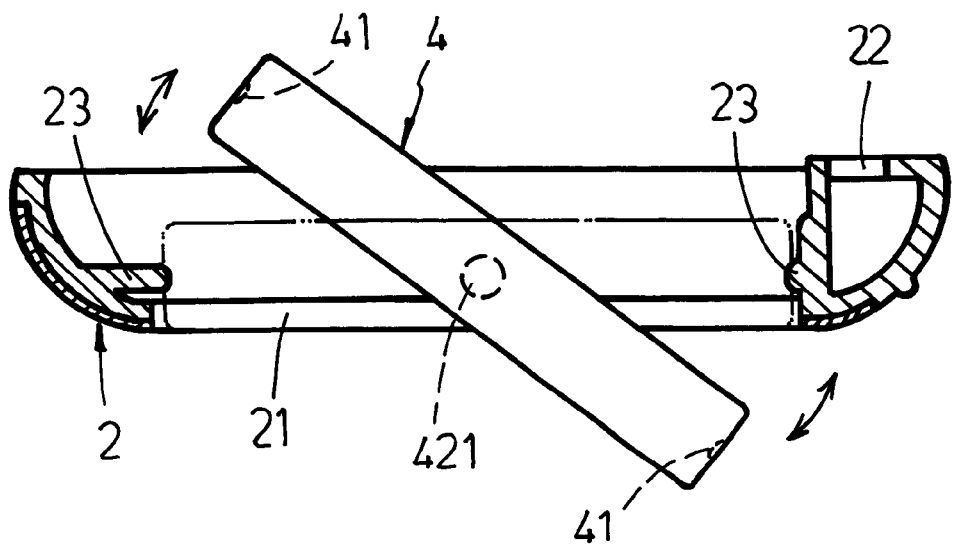
FIG. 7 is a schematic drawing showing the calculator turned about an axis relative to the bottom cover shell.
Figure 8:
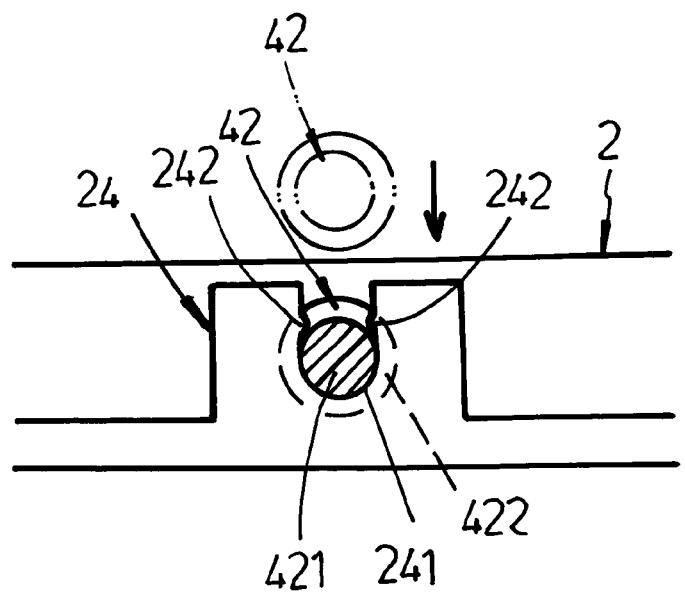
FIG. 8 is a schematic drawing showing the positioning of one pivot bolt in the U-shaped top notch at the corresponding upright lug according to the present invention.

Referring to FIGS. 7 and 8 and FIGS. from 4 through 6 again, the bottom cover shell 2 is an open frame comprising a rectangular center opening 41 having a size approximately equal to the calculator 4, two upright lugs 24 respectively disposed at two opposite short sides of the center opening 21 on the middle, and two locating rods 23 respectively disposed at two opposite long sides of the center opening 21 on the middle. The upright lugs 24 each comprise a U-shaped top notch 241, and two retaining portions 242 bilaterally projecting into the U-shaped notch 241 on the middle and facing to each other. The calculator 4 comprises two pivot bolts 42 respectively raised from two opposite short sides thereof on the middle, and two positioning recesses 41 respectively provided at two opposite long sides thereof on the middle for engagement with the locating rods 23 at the bottom cover shell 2. The pivot bolts 42 each comprise a shank 421 raised from one short side of the calculator 4, and a head 422 at one end of the shank 421 remote from the calculator 4. The pivot bolts 42 are respectively pivotally fastened to the upright lugs 24 by forcing the shank 421 of each pivot bolt 42 into the U-shaped top notch 241 at the corresponding lug 24. When set into position, the shank 421 is pivotally retained to the corresponding U-shaped top notch 241 by the corresponding retaining portions 242. When assembled, the calculator 4 can be turned about the axis passing through the upright lugs 24 through 360°, and set between a first position with its face panel disposed inside the bottom cover shell 2 as shown in FIG. 5, and a second position with its face panel disposed outside the bottom cover shell 2 as shown in FIG. 6. When set in the first or second position, the positioning recesses 41 of the calculator 4 are respectively engaged with the locating rods 23 at the bottom cover shell 2.

While only one embodiment of the present invention has been shown and described, it will be understood that various modifications and changes could be made thereunto without departing from the spirit and scope of the invention disclosed.

What the invention claimed is:

1. A palm-top calculator and name card combination comprising a bottom cover shell, a top cover shell pivoted to said bottom cover shell, a partition board pivoted to said bottom cover shell and said top cover shell for covering on said top cover shell on the inside to hold storage name cards in said top cover shell, and a calculator mounted in between said top cover shell and said bottom cover shell, wherein said bottom cover shell comprises a rectangular center opening for receiving said calculator, and two upright lugs respectively disposed at two opposite short sides of said center opening, said upright lugs each comprising a U-shaped top notch, and two retaining portions bilaterally projecting into said U-shaped notch on the middle and facing to each other; said calculator comprises two pivot bolts respectively raised from two opposite short sides thereof on the middle and pivoted to the upright lugs at said bottom cover shell, said pivot bolts each having a shank fitted into the U-shaped top notch at one upright lug at said bottom cover shell and retained in place by the retaining portions of the corresponding upright lug, and a head at one end of said shank remote from the corresponding short side of said calculator.

2. The palm-top calculator and name card combination of claim 1 wherein said calculator comprises two positioning recesses respectively disposed at two opposite long sides thereof on the middle for positioning in said bottom cover shell, and said bottom cover shell comprises two locating rods respectively disposed at two opposite long sides of said center opening for engaging the positioning recesses at said calculator to hold said calculator in position.

* * * * *